(12) United States Patent
Meyer

(10) Patent No.: US 7,979,957 B2
(45) Date of Patent: Jul. 19, 2011

(54) APPARATUS FOR COLLECTING LIGHTWEIGHT PACKING PARTICULATES

(76) Inventor: Gretchen A. Meyer, Rancho Mirage, CA (US)

( * ) Notice: Subject to any disclaimer, the term of this patent is extended or adjusted under 35 U.S.C. 154(b) by 268 days.

(21) Appl. No.: 12/317,329

(22) Filed: Dec. 23, 2008

(65) Prior Publication Data

US 2010/0107579 A1 May 6, 2010

Related U.S. Application Data

(60) Provisional application No. 61/198,202, filed on Nov. 4, 2008.

(51) Int. Cl.
*A47L 9/02* (2006.01)
*A47L 9/08* (2006.01)

(52) U.S. Cl. ............ 15/347; 15/352; 15/415.1; 55/433; 55/467; 55/385.1

(58) Field of Classification Search .................... 15/344, 15/347, 352, 353, 415.1; 55/301, 304, 305, 55/433, 475, 487, 300, DIG. 3; 95/278, 282; 210/350
See application file for complete search history.

(56) References Cited

U.S. PATENT DOCUMENTS

| | | | |
|---|---|---|---|
| 4,175,352 A | 11/1979 | Catlett | |
| 4,391,017 A * | 7/1983 | Bruensicke | 15/313 |
| 4,607,451 A | 8/1986 | Jarecki | |
| 4,673,424 A | 6/1987 | Range | |
| 4,780,986 A | 11/1988 | Broomfield et al. | |
| 4,831,685 A * | 5/1989 | Bosyj et al. | 15/344 |
| 5,000,623 A | 3/1991 | Kihlstrom | |
| 5,060,339 A * | 10/1991 | Evers | 15/246 |
| 5,088,860 A | 2/1992 | Stockdale et al. | |
| 5,123,142 A * | 6/1992 | Miller | 15/393 |
| 5,259,087 A | 11/1993 | Loveless et al. | |
| 5,323,819 A | 6/1994 | Shade | |
| 5,377,383 A | 1/1995 | Christensen | |
| 5,410,775 A | 5/1995 | Frazier | |
| 5,741,093 A | 4/1998 | Schonberg et al. | |
| 5,833,287 A | 11/1998 | Shade | |
| 6,125,501 A * | 10/2000 | Yip | 15/344 |
| 6,170,118 B1 | 1/2001 | McIntyre et al. | |
| 6,216,876 B1 | 4/2001 | Quillian, III | |
| 6,223,387 B1 | 5/2001 | Anderson | |
| 6,286,569 B1 | 9/2001 | Brandenburg et al. | |
| 6,574,829 B1 * | 6/2003 | Marcum et al. | 15/347 |
| 6,973,944 B2 | 12/2005 | Anderson et al. | |
| 7,207,139 B2 | 4/2007 | McKinnis et al. | |
| 7,291,189 B2 * | 11/2007 | Lim et al. | 55/337 |
| 7,572,307 B2 * | 8/2009 | Coburn | 55/332 |
| 7,799,103 B2 * | 9/2010 | Coburn | 55/304 |
| 2004/0034963 A1 * | 2/2004 | Rogers et al. | 15/415.1 |
| 2005/0044659 A1 * | 3/2005 | Rickman | 15/415.1 |
| 2008/0209669 A1 * | 9/2008 | Kah | 15/350 |
| 2010/0107358 A1 * | 5/2010 | Wibbling | 15/415.1 |

* cited by examiner

*Primary Examiner* — Duane Smith
*Assistant Examiner* — Minh-Chau Pham
(74) *Attorney, Agent, or Firm* — I. Michael Bak-Boychuk

(57) ABSTRACT

A vacuum cleaner attachment useful to collect dispersed packing particulates and the like comprises a thin-walled polymeric enclosure defined by a plurality of generally planar panels surrounding at their free edges a receiving opening through which the particulates are collected by the vacuum draw against a perforated screening structure. As the particulates accumulate in the enclosure the large pressure drop across the outer ranks thereof produces inward pressure forces across the panels, resulting in the inward flexures thereof to assist in the retention of the particulates in the enclosure as it is moved over a collection receptacle.

13 Claims, 3 Drawing Sheets

APPARATUS FOR COLLECTING LIGHTWEIGHT PACKING PARTICULATES

REFERENCE TO RELATED APPLICATIONS

This application obtains the benefit of the earlier filing date of U.S. Provisional Application Ser. No. 61/198,202 filed on Nov. 4, 2008.

BACKGROUND OF THE INVENTION

1. Field of the Invention

The present invention relates to vacuum pick-up devices, and more particularly to vacuum attachments useful in picking up, retaining and thereafter collecting for re-use or disposal lightweight packing particulates.

2. Description of the Prior Art

Those engaged in the manufacture and then the shipment of goods are always concerned over any damage that may be sustained during transport and various mechanisms and techniques have been devised to insulate the shipped article from impact damage. Where the article is produced in large numbers that are then widely distributed, and particularly where the shape of the article is well defined, the cost of specialized packaging may be distributes over its large shipping volumes and conformingly shaped plastic foam structures are frequently utilized to fix the article in its packaging and/or its shipping container. Articles that are replicated in lower numbers and/or are characterized by irregular shapes, however, are generally shipped without any specifically shaped impact protection and are buried instead within large quantities of plastic foam particulates sometimes referred to as 'packing pop-corn'.

While the use in shipping of these lightweight packing particulates has gained wide acceptance, the light weight and dielectric material structure of the individual particulate kernels has rendered them susceptible to attraction and dispersal by static charge and also to unwanted distribution by air currents because of their high surface-to-volume ratios and the handling thereof is therefore a bothersome, particularly to those concerned over conservation and therefore our environment. Simply, the generalized nature of this particulate matter strongly suggests its re-use, or at least the recycling thereof, and for these reasons various collection techniques and mechanisms have been proposed in the past that in one way or another seek to accommodate these objectives.

Some examples of the solutions proposed in the prior art that are devoted to this problem can be found in the teachings of U.S. Pat. No. 6,973,944 to Anderson et al.; U.S. Pat. No. 6,286,569 to Brandenburg et al; U.S. Pat. No. 5,741,093 to Schonberg et al; U.S. Pat. No. 5,323,819 to Shade; U.S. Pat. No. 5,088,860 to Stockdale et al; U.S. Pat. No. 5,000,623 to Kihlstrom, and others. Each of the foregoing, while suitable for the purposes intended, entails devices and processes designed for large scale commercial use which include substantially sized packing particulate containers from where the particulates are dispensed, or into which they are collected, and are therefore clearly not conformed for the occasional household use.

Those devices that are characterized by their small size, simplicity and portability are mostly found in the analogous art related to insect capture and collection, as exemplified in U.S. Pat. No. 4,780,986 to Broomfield et al; U.S. Pat. No. 4,607,451 to Jarecki; U.S. Pat. No. 4,175,352 to Catlett; and others. While again suitable for the purposes intended, each of these include a removable collection bed on which the ingested matter is collected along with some form of a capturing cover. Of course, the added complexity of a removable screen on which the insect or debris is collected, together with some form of closure to prevent their escape, are each a constraint on the collection task, thus adding cost and structural complexity.

These same structural constraints have also appeared in those prior art examples that have focused on a fully portable mechanism for collecting packing particulates, as exemplified in U.S. Pat. No. 5,833,287 to Shade; U.S. Pat. No. 5,410,775 to Frazier; and others. While once again suitable for the purposes intended this added structure limits the form of the device to a self-powered device and not as a simple and inexpensive attachment for a household vacuum.

The structural complexity associated with retaining closures that capture the particulates that have been collected thus complicates the function of the device and a collection assembly conformed for a simple attachment to a portable vacuum that captures the particulates collected therein is therefore extensively desired and it is one such assembly that is disclosed herein.

SUMMARY OF THE INVENTION

Accordingly, it is the general purpose and object of the present invention to provide a vacuum cleaner attachment conformed as a thin-walled polymeric chamber for collecting packing particulates therein.

Other objects of the invention are to provide a hollow thin-walled polymeric receptacle attachable to a vacuum cleaner and conformed for capturing wall flexure upon the collection of particulates therein.

Yet further objects of the present invention are to provide a vacuum cleaner attachment formed substantially as a thin-walled polymeric chamber conformed to flex the panels thereof onto the particulates collected therein in response to the vacuum draw therethrough.

Additional and further objects of the present invention shall become apparent upon the considered review of the description set out below, in conjunction with the illustrations that follow.

Briefly, these and other objects are accomplished within the present invention by providing a vacuum cleaner attachment generally conformed as a hollow rectangular enclosure defined by thin-walled polymeric panels that at one end are convolved to form an operative connection with the hose end of a vacuum cleaner. At the other end the panels define a generally rectangular opening through which the packing particulates are accumulated by the vacuum draw and aggregated as an interstitially ventilated mass against a screening structure covering the connection to the vacuum cleaner hose. To insure continuing airflow even when abutted against a flat surface, e.g., a floor surface, the free edges of each panel that surround the opening are each convolved along an arc spanning the distance between the corners of the enclosure, thereby forming arcuate edge apertures when thus abutted to form an airflow path for the vacuum draw.

The foregoing general configuration of the inventive vacuum attachment structure may be implemented in several manners which, in accordance with the first embodiment, may include a flat retaining screen mounted transversely within the tapering portion of the enclosure that connects to the vacuum hose, to span across and screen the air pathway to the vacuum hose. Preferably, the screen includes openings each just smaller than the typical size of the packing particulates to thereby form a base supporting the collected particulates that are ingested into the enclosure, while at the same time allowing the associated smaller debris to pass with the airflow through the interstitial spaces into the vacuum cleaner collection bag that is usually provided.

Alternatively, and in accordance with the second embodiment, a tubular adapter provided with a closed, cup-shaped end and conformed at the other end to receive the end of the vacuum hose includes a plurality of perforations in the closed end that are each again just smaller than the sectional dimension of the packing particulates. This pierced end segment is formed along an exterior taper conformed for receipt within the connection opening in the attachment enclosure to be engaged therewith by a set of twist interlock posts. Thus, once fully inserted and engaged so that the perforated end is inside the enclosure full air draw communication is provided which screens the particulates collected. As in the prior embodiment, the particulates that are accumulated by vacuum draw against this perforated end provide interstices through which airflow, with any entrained debris, can pass into the vacuum cleaner collection bag.

In this manner both embodiments deploy the rectangular enclosure on the end of the vacuum hose so that its opening is aligned towards the spilled packing particulates and as these are accumulated against the screen, or the perforated surface, the exterior particulate ranks form the interstices in which the largest airflow drag losses occur. Consequently, those portions of the enclosure behind the outer particulate rank, i.e., those wall panels defining that part of the enclosure that already contains the collected particulates, are exposed to substantially the full pressure differential developed by the vacuum cleaner and will therefore flex inwardly because of the area and span dimensions of the of the loaded surface, collapsing against the accumulated load to assist in the retention thereof.

Of course, when the enclosure is empty at the start of the collection process substantially the whole pressure drop is confined to the tapering portion defining the interface with the vacuum hose, an enclosure portion endowed with the rigidity of obtained in a monococque structure, thus assuring that the outer parts of the enclosure remain unflexed to facilitate the collection process. Once the particulates start accumulating in the enclosure, however, those skilled in the art will appreciate that the area and span of the panels subjected to the pressure differential, and therefore their inward flexure, increases as the collected amount of particulates increases, thereby increasing in the particulate retaining flexure as more and more is collected.

Accordingly, as the particulates accumulate in the enclosure to increase the interstitial labyrinth length, and thereby reduce the total airflow by the sheer drag losses, a synergistically compensating retention flexure of the panels invariably follows. In this manner large quantities of particulates can be efficiently picked up and moved for collection while the vacuum draw is on and then simply released into the collection bin by separating the attachment from the hose end or by switching off the power to the vacuum cleaner.

DESCRIPTION OF THE PREFERRED EMBODIMENTS

Figure 1:
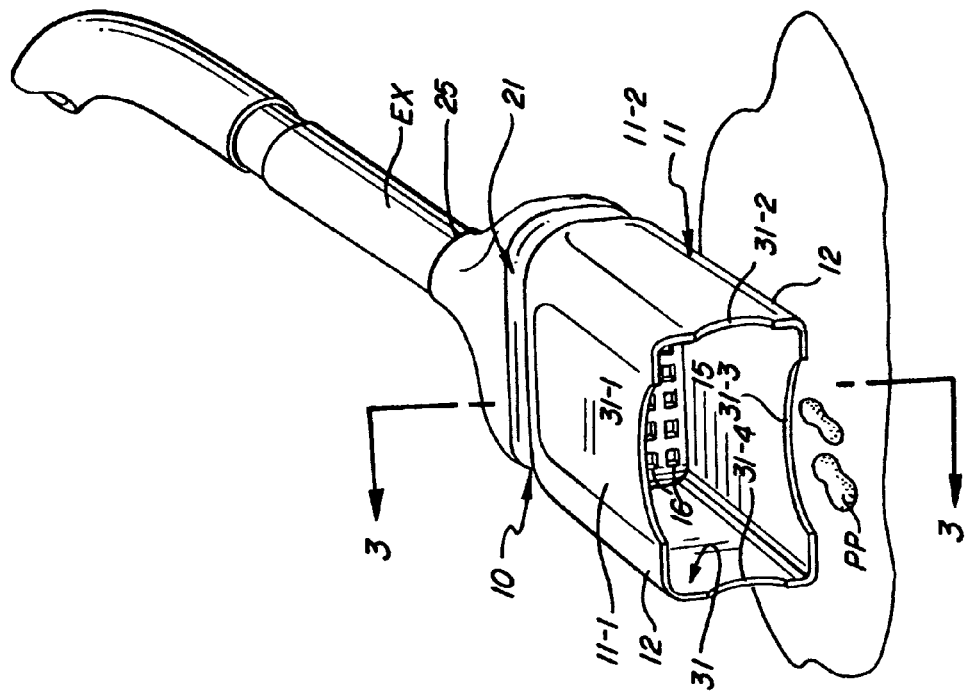
FIG. 1 is a perspective illustration, separated by parts, of the inventive packing particulate collection attachment in accordance with the first embodiment thereof.
Figure 2:
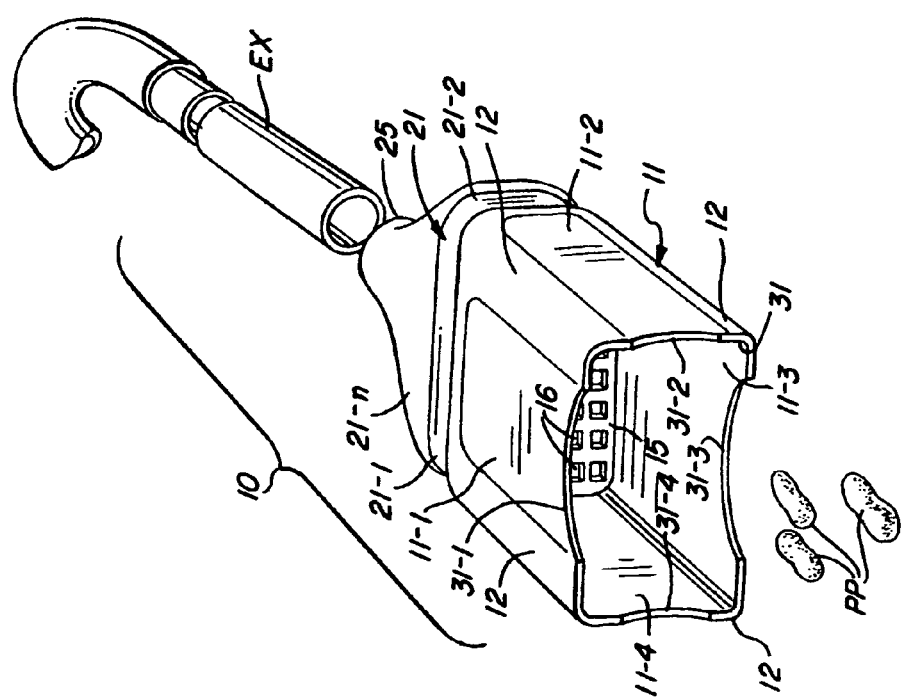
FIG. 2 is a further perspective illustration of the inventive particulate collection attachment shown in FIG. 1.
Figure 3:
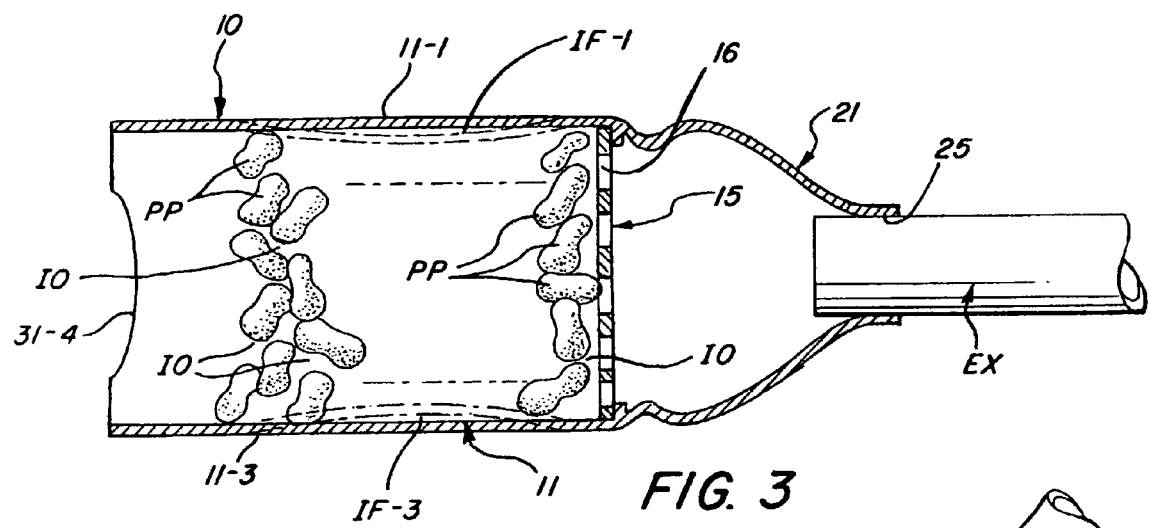
FIG. 3 is a sectional view taken along line 3-3 of FIG. 2 and depicting the panel flexures resulting from the restrictions in the airflow caused by the collected particulates.

As shown in FIGS. 1 through 3, the inventive particulate collection attachment, generally designated by the numeral 10, comprises a generally rectangular enclosure 11 defined by a set of substantially flat, thin-walled polymeric side panels 11-1 and 11-3 spanning in an opposing alignment relative each other between adjacent longitudinal corner bends or folds 12 that also join a further opposing set of thin-walled polymeric panels shown as the upper panel 11-2 and also the correspondingly lower panel 11-4. At one end each of the corner folds 12 and the panels 11-1, 11-2, 11-3 and 11-4 spanning between them extend in common from a substantially frustoconical thin-walled end piece 21 which through various surface convolutions 21-1 through 21-n reduces to a circular opening 25 conformed to receive in mating fit the end of a tapered extension piece EX.

At the other end the free edges of the corner bends 12 together with the edges of the panels 11-1, 11-2, 11-3 and 11-4 between them then form the receiving opening 31 which is further shaped to preclude inadvertent sealing contact against a flat surface by a set of arcuate cut-outs 31-1, 31-2, 31-3 and 31-4 of each of the edge portions of the corresponding panels. In this manner a thin-walled polymeric receptacle is formed which obtains most of its rigidity from the monocoque structure of end piece 21 at one end which is easily fitted and engaged by friction to the tapered extension EX that adapts to the hose end HE of a conventional vacuum cleaner. A screen 15 provided with screen openings 16 that are smaller than the sectional dimensions of the packing particulates PP spanning within the end piece across opening 25 is then useful to accumulate the particulates within the enclosure 11 once the vacuum is turned on.

Those skilled in the art will appreciate that as the particulates PP accumulate on screen 15 the air flow AF through interstices 10 between the outer ranks thereof will suffer the highest drag losses simply because of the velocity squared effect. The inner ranks, in turn, will see a correspondingly lower static pressure and as the collected particulates PP accumulate in the enclosure 11 increasingly larger areas of panels 11-1 through 11-4 are exposed to this pressure differential, causing inward flexures IF-1 through IF-4 in each one thereof, compressing the particulates therebetween. Thus as long as the vacuum draw persists the collected particulates are held captive in the enclosure, but once the attachment is separated, or the vacuum cleaner it is turned off, the retention flexure is released allowing for their easy disposal into a collection receptacle.

Figure 5:
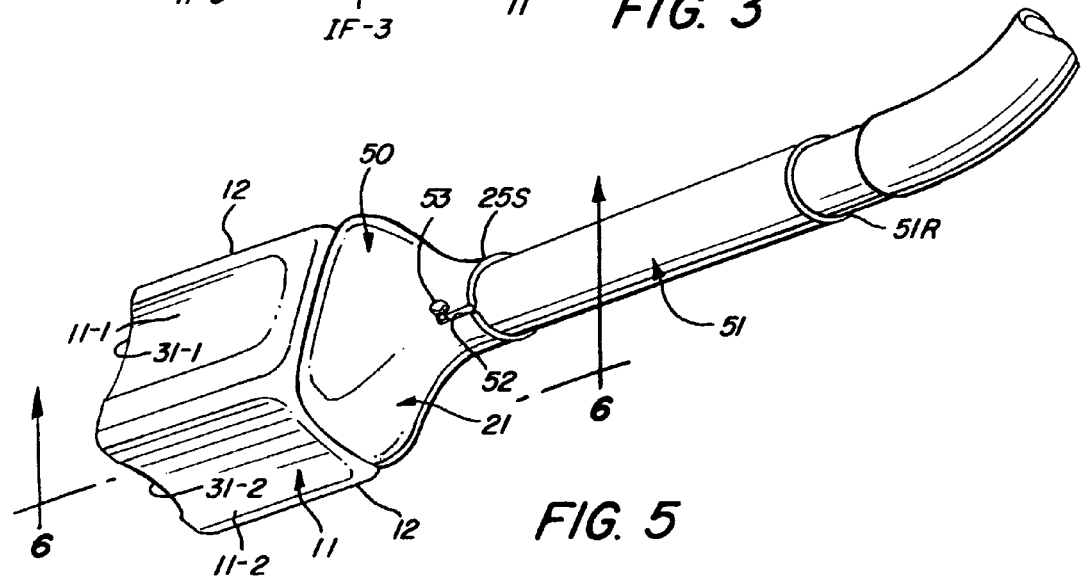
FIG. 5 is yet another perspective illustration of the inventive particulate collection attachment shown in FIG. 4.
Figure 4:
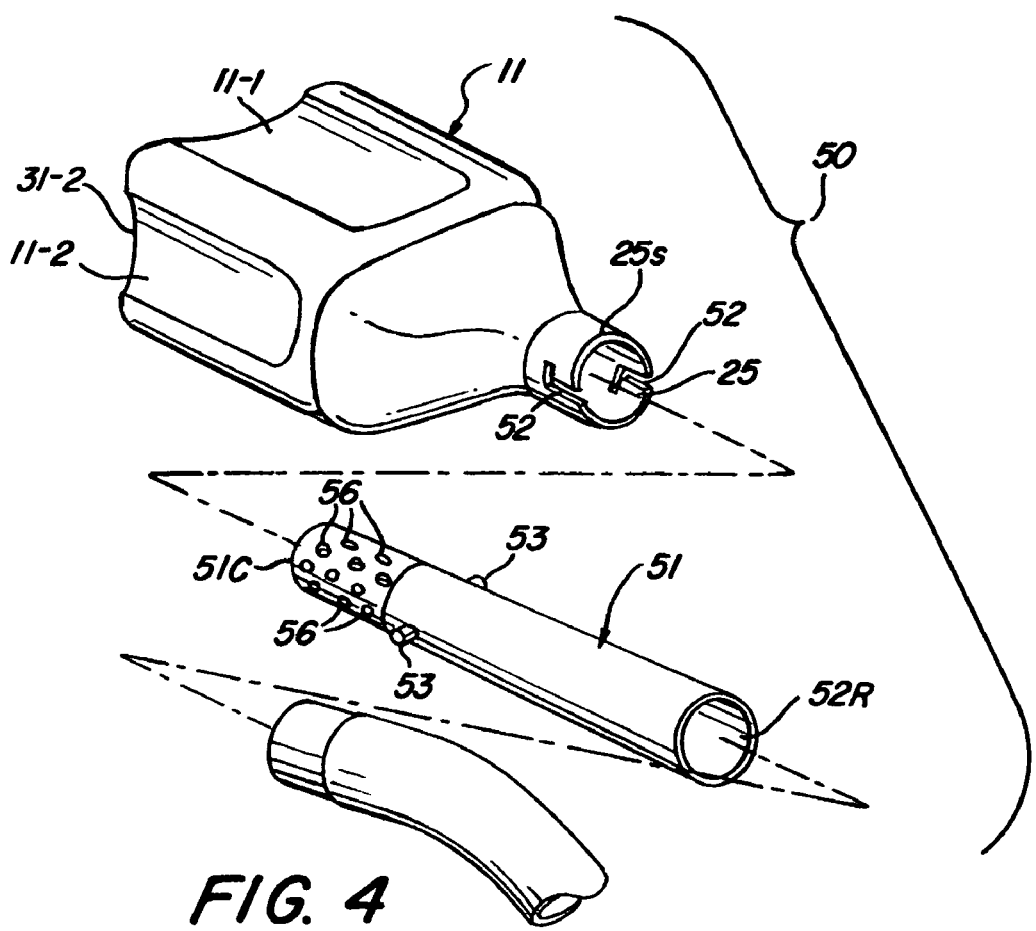
FIG. 4 is a perspective illustration, separated by parts, of the inventive packing particulate collection attachment in accordance with the second embodiment thereof.
Figure 6:
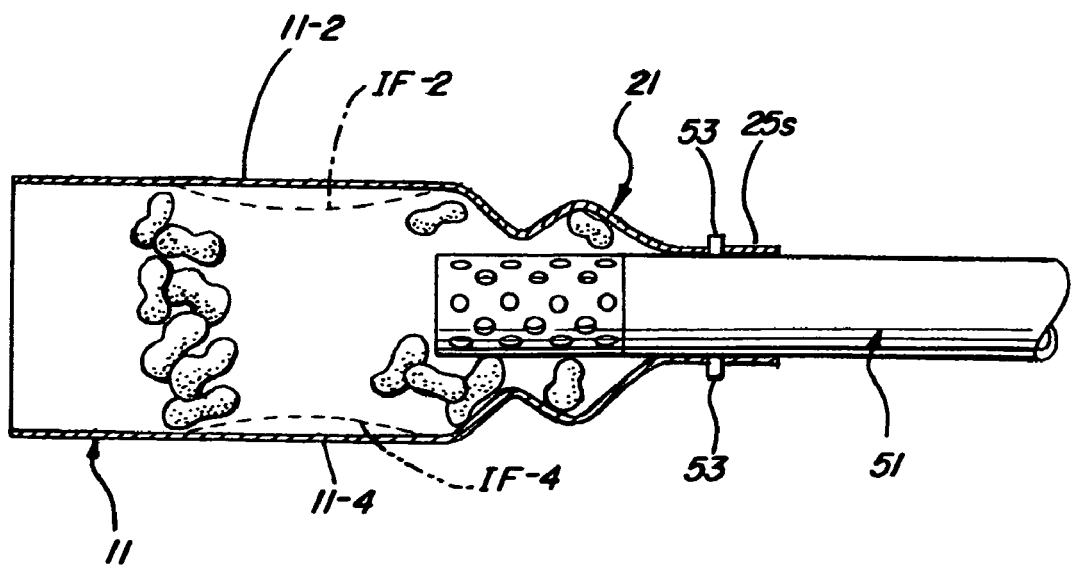
FIG. 6 is a further sectional view taken along line 6-6 of FIG. 5 illustrating the panel flexures of the second embodiment of the present invention.

By particular reference to FIGS. 4, 5 and 6, a second embodiment of the inventive particulate collection attachment, generally designated by the numeral 50, is again characterized by a substantially rectangular thin-walled enclosure 11. Like numbered parts functioning in a like manner to that previously described, enclosure 11 is again defined by substantially flat, thin-walled polymeric panels 11-1 through 11-4 each spanning between the adjacent corner bends 12 joining at one end to a generally frustoconical end piece 21 provided with opening 25 fitted to receive the end of the generally cylindrical extension.

Unlike the previous example, however, attachment 50 omits the screen 15 within piece 21 and, in stead, provides a cylindrical insert 51 that is closed at one end 51C and fitted at its other end 51R for receipt of the vacuum hose end HE. The surfaces around the closed end 51C, in turn, are conformed for receipt within opening 25 in lieu of the extension EX with the portions thereof exposed within end piece 21 provided with a plurality of perforation 56 for conveying airflow, the perforations once again being sized to exclude ingestion of the particulates PP. To insure a secure engagement with the received closed end the end opening 25 includes an annular skirt 25S provided with opposed L-shaped grooves 52 each conformed to receive a corresponding radial post 53 formed on the exterior of the insert 51 for cooperative engagement in the manner of twist lock. Once thus engaged with the enclosure 11 the cylindrical mount can then be mounted in its fitted relationship onto the hose end HE.

Those skilled in the art will further appreciate that the foregoing inventive enclosure, in its several forms, can be easily fabricated by known techniques such as blow molding or vacuum draw molding of various polymeric membranes that result in panel thicknesses of 0.02 to 0.15 inches, a material thickness easily obtained in thermoplastic polymeric structures that are both translucent or opaque. This same molding convenience can also be utilized to include various stiffening deformations where either added structural stiffness is desired or a larger capacity is entailed.

Thus both forms of the inventive attachment are easily formed by the same or similar fabrication processes as those entailed in forming plastic bottles and the like. The generally rectangular form of the enclosure, moreover, lends itself for convenient stiffness control by selectively positioned convolutions and other stiffening geometry directly in the mold itself, thus providing an easily fabricated structure that is conveniently installed and removed from the hose end and is thus adaptable to various commercially available vacuum cleaners.

Of course, should visibility into the enclosed collection cavity be desired the selection of translucent materials for the fabrication of the enclosure 11 is easily obtained with the disassembly convenience of the second embodiment particularly enhancing the convenience of the cleaning thereof. In this manner both the use convenience and also the fabrication convenience are easily obtained in the inventive structure.

Obviously many modifications and variations of the instant invention can be effected without departing from the spirit of the teachings herein. It is therefore intended that the scope of the invention be determined solely by the claims appended hereto.

I claim:

1. An attachment useful for collecting packing particulates and conformed for releasable engagement to the end of a vacuum hose extending from a vacuum cleaner, comprising:
    a generally rectangular enclosure defined by a generally planar upper and lower thin resilient panel spanning in a spaced alignment between a pair of opposing side panels and aligned to extend about a generally rectangular receiving opening communicating into said enclosure and joined to an end closure provided with an end opening conformed to receive said end of said vacuum hose, said enclosure and end closure forming in combination an interior cavity communicating with said receiving opening; and
    screening means disposed in said end closure for restricting the passage of said particulates into said end opening, said screening means comprising a tubular adapter conformed for insertion into said end opening including a perforated closure of the insertable end thereof including perforations of a dimension smaller than the sectional dimension of said particulates and an aperture at the other end thereof conformed to receive said end of said vacuum hose, whereby said particulates accumulated at said screening means effects an inward flexure of said upper and lower panels towards each other.

2. An attachment according to claim 1, wherein:
    said rectangular enclosure comprises a polymeric material structure.

3. An attachment according to claim 1, wherein:
    said rectangular enclosure comprises a translucent polymeric material structure.

4. A vacuum cleaner attachment useful for collecting and retaining dispersed packing particulates and conformed for releasable engagement to the end of a vacuum hose extending from said vacuum cleaner, comprising:
    a thin walled enclosure defined by a plurality of opposingly aligned, generally planar resilient panels joined to each other to form at the one ends thereof a generally rectangular receiving opening communicating into said enclosure and joined at the respective other ends thereof to an end closure provided with an end opening conformed to mate with said vacuum hose, said enclosure and end closure forming in combination an interior cavity communicating to the exterior through said receiving opening, each said panel comprising a thin resilient membrane; and
    screening means disposed in said end closure for restricting the passage of said particulates into said end opening, whereby said particulates accumulated at said screening means effect an inward flexure of said opposed panels towards each other.

5. An attachment according to claim 4, wherein:
    said screening means comprises a generally tubular adapter defined by an insertable end and a receiving end, said insertable end being conformed for insertion into said end opening and including a perforated closure end thereof including perforations of a dimension smaller than the sectional dimension of said particulates and said receiving end including an aperture conformed to receive said end of said vacuum hose.

6. An attachment according to claim 5, wherein:
    said enclosure comprises a polymeric material structure.

7. An attachment according to claim 5, wherein:
    said enclosure comprises a translucent polymeric material structure.

8. An attachment according to claim 4, wherein:
    said screening means comprises a perforated planar panel insertable transversely into said enclosure to span across said end opening including perforations of a dimension smaller than the sectional dimension of said particulates; and
    said end opening is conformed to receive said end of said vacuum hose.

9. An attachment according to claim 8, wherein:
    said enclosure comprises a polymeric material structure.

10. An attachment according to claim 9, wherein:
    said polymeric material structure is translucent.

11. A vacuum cleaner attachment useful for collecting and retaining dispersed packing particulates and conformed for releasable engagement to the end of a hose extending from said vacuum cleaner, comprising:
    a thin walled polymeric enclosure defined by a plurality of opposing, generally planar resilient panels joined to each other to define at the free edges thereof a generally rectangular receiving opening communicating into said enclosure and joined at the respective other edges thereof to an end closure provided with an end opening, said enclosure and end closure forming in combination an interior cavity communicating into said receiving opening, each said panel comprising a thin resilient membrane; and screening means disposed in said end closure for restricting the passage of said particulates into said end opening, said screening means including perforations smaller than the sectional dimension of said packing particulates, whereby said particulates accumulated at said screening means effect an inward flexure of said opposed panels towards each other.

12. An attachment according to claim 11, wherein:
said free edge of selected ones of said panels is formed along an arc.

13. An attachment according to claim 12, wherein:
said enclosure comprises a polymeric material structure.

\* \* \* \* \*